United States Patent [19]

Franchi

[11] Patent Number: 4,843,219
[45] Date of Patent: Jun. 27, 1989

[54] DEVICE FOR AUTOMATIC READING OF CHEQUES, BILLS AND THE LIKE AND FOR ELECTRONIC MANAGEMENT OF THE DATA DETECTED

[75] Inventor: Sergio Franchi, Pisa, Italy

[73] Assignee: SEAC Engineering S.R.L., Italy

[21] Appl. No.: 191,552

[22] Filed: May 9, 1988

[30] Foreign Application Priority Data

May 11, 1987 [IT] Italy .................................. 9389 A/87

[51] Int. Cl.$^4$ ............................................. G06F 15/30
[52] U.S. Cl. ..................................................... 235/379
[58] Field of Search ......................................... 235/379

[56] References Cited

U.S. PATENT DOCUMENTS 4,745,266 5/1988 Miura .................................. 235/379

Primary Examiner—Harold I. Pitts
Attorney, Agent, or Firm—McGlew & Tuttle

[57] ABSTRACT

A device for automatic reading of data on cheques, bankable bills and the like. A housing in which is made an open channel or slot defining a U-shaped track for the said cheques or bills. Along this track there are arranged in combination: sensor members for detecting the presence of a cheque or bill to be read; members for the conveyance of the said cheque or bill; and members for reading the data reproduced on the said cheque or bill.

10 Claims, 3 Drawing Sheets

DEVICE FOR AUTOMATIC READING OF CHEQUES, BILLS AND THE LIKE AND FOR ELECTRONIC MANAGEMENT OF THE DATA DETECTED

BACKGROUND OF THE INVENTION

The subject of the invention is a reader of cheques and bankable bills for computerized management of the data detected in the reading process, which is readily installable at a bank counter due to the limited space it occupies and to the fact that the input and output are close together.

Essentially a device for automatic reading of data on cheques, bankable bills and the like according to the invention comprises a housing in which is made an open channel or slot definng a U-shaped track for the said cheques or bills; along the said track are arranged in combination: sensor members for detecting the presence of a cheque or bill to be read; members for conveying the said cheque or bill; and members for reading the data reproduced on the said cheque or bill.

In a practical embodiment, the said conveying members comprise a stepping motor which controls the rotation of a pulley which in turn actuates belt members for the conveyance of the said cheques and for the driving of devices for directing the said cheques towards the said readin members.

The slot or channel can be at an incline or directly vertical, with the opening upwards.

In practice, the said conveying members comprise a first driven pulley and a second idle pulley, the sid second idle pulley being brought into contact with the first driven pulley by means of an electromagnet actuated by the said sensor.

It is an advantage for the said driven pulley to rotate about an inclined axis.

The U-shaped track can in practice display a first input section and a second output section, the shape of the said input section being user-specified to facilitate insertion of the cheque or bill and the said output section being of larger dimensions than the rest of the U-shaped track to allow the cheques and bills to accumulate after being read.

Another sensor can be located in alignment with the entrance to the said output section to detect the passage of the cheques being output.

It is an advantage for a leaf spring to be installed in the said output section, which spring compresses the accumulated documents.

The reading members can be members for magnetic and/or optical reading.

BRIEF DESCRIPTION OF THE DRAWINGS

The invention will be more readily understood by following the description of the attached drawing, which illustrates one practical embodiment of the invention, to provide a non-limitative example. In the drawing.

DESCRIPTION OF THE PREFERRED EMBODIMENT

Figure 1:
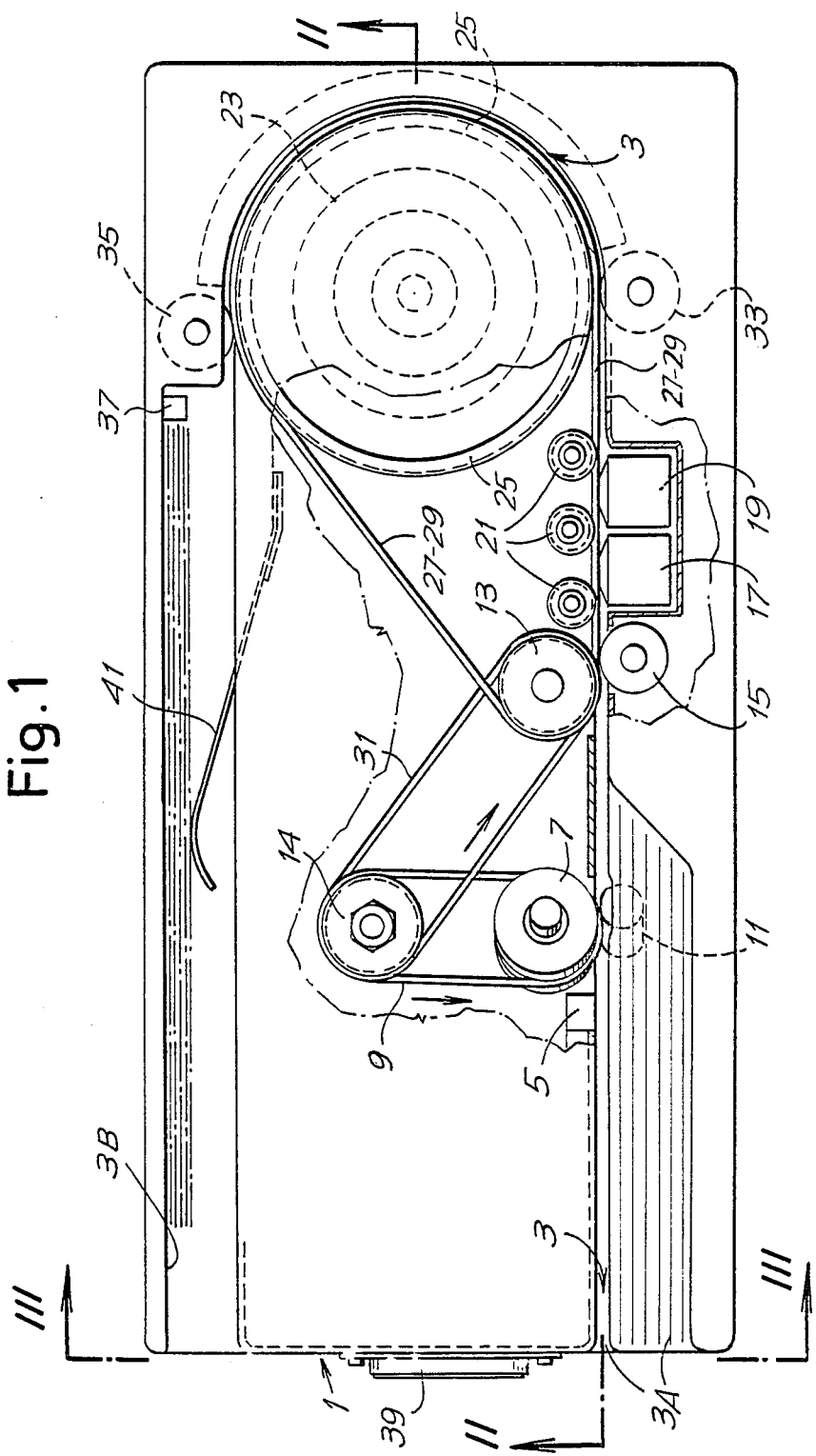
FIG. 1 represents a plan view of the device according to the invention.
Figure 2:
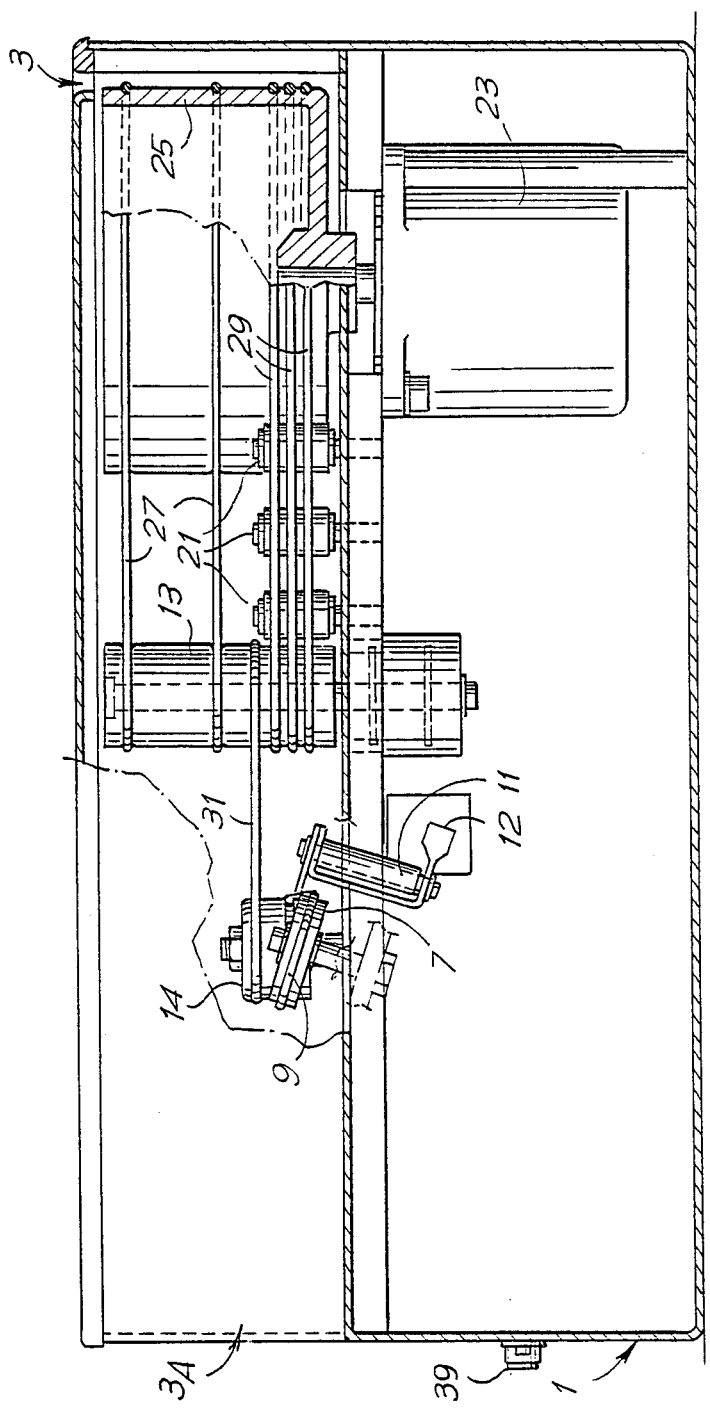
FIG. 2 represents a section in accordance with II—II in FIG. 1.
Figure 3:
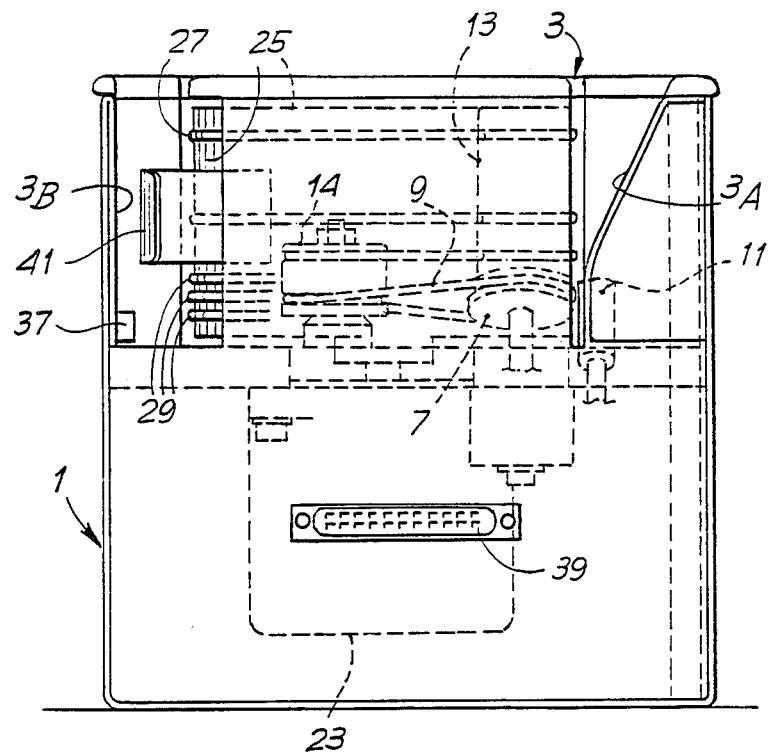
FIG. 3 represents a view in accordance with III—III in FIG. 1.

In accordance with what is shown in the attached drawing, a device in accordance with the invention comprising a housing 1 with a U-shaped slot 3 at the top (FIG. 1) having an input section 3A of a shape that is user-specified to facilitate the introduction of the cheques and an output section 3B of larger dimensions for the purposes explained below.

The slot 3 forms a track along for the cheques and bills to be read, for which purpose they are inserted in the slot at 3A and taken out at 3B. Along the track defined by the slot 3 are arranged the devices for advancing and controlling the cheques and for reading off the data reproduced on them. In particular, a first sensor 5 is located in the vicinity of the input section 3A of the slot 3, downstream of which sensor 5 there is a pulley 7 that is driven by a belt 9, of circular section in the drawing, in the manner described below. The pulley 7 interacts with an idle pulley 11, which can be brought into contact with the pulley 7 by the action of an electromagnet (not shown) via a lever 12. Downstream of the pulley 7, along the travel path of the cheque, is located another pulley 13, driven as described below, which interacts with a pressure wheel 15. The said pulley 13 and the said wheel 15 are installed upstream of a set of magnetic heads 17, 19 of which the first magnetizes the magnetic ink on the cheque or bill being read and the second effects the reading. The said magnetic heads interact with pressure rollers 21 suitably disposed along the travel path of the cheque in front of the said heads. Apart from the magnetic heads 17, 19 other reading means can be provided, for example of an optical type or another kind.

For conveying the cheque or bill introduced into the slot 3 a stepping motor 23 is provided which controls the rotation of a large-diameter cylindrical pulley 25; belts 27, 29 of circular section are passed over the pulley 25 at different and predetermined levels. The belts 27, 29 are passed over the pulley 13, which is thus controlled in rotation. The pulley 13 in turn controls the rotation of a pulley 14 by means of a belt 31. The pulley 14 actuates the belt 9, and hence the pulley 7. The belts 29 also interact with the rollers 21 in order to keep the cheque in contact with the heads 17, 19 to enable reading thereof. The belts 27,29 pull the cheque after it has been read towards the output section 38 of the slot 3 causing it to execute a 180° turn. Two small idlers 33, 35 interact with the pulley and keep the cheque held against the pulley 25 or against the belts passed over it in order to permit it to advance.

A sensor 37 is located in alignment with the beginning of the output section 38 of the slot 3 and detects the passage of the cheque or bill for the purposes explained below.

The reading unit can be linked, by means of an appropriate gate 39, with a central computer or with a personal computer for processing of the data that are read and for management of the said device.

The device functions as follows.

The cheque or bill to be read is placed in the input section 3A of the slot 3. Here the sensor 5, detecting the presence of the cheque, actuates start-up of the motor 23 and hence the rotation of the pulley 7. As soon as the motor 23 has been started up, the control electromagnet of the pulley 11 is excited and as a result the pulley 11 is brought into contact with the pulley 7 and interacts with it in order to feed the cheque forward. The pulley 7 is advantageously arranged with its axis at an incline to the vertical to ensure that the cheque is in the correct position on the bottom of the slot 3, in such a manner that the strip on which the symbols to be read by the magnetic heads 17, 19 are imprinted is positioned correctly with respect to these heads. The cheque is then read and conveyed—with the aid of the belts 27, 29—to section 38 of the slot 3, which section 38 is wide enough to permit the accumulation of a large number of cheques read in sequence. The sensor 37 at the exit from the 180° stretch of track travelled by the cheque round the pulley 25 actuates the stopping of the motor 23 until the next command is received from the sensor 5.

A spring 41 or similar device can be provided in order to keep together the cheques being output.

The device that is illustrated can be equipped with heads for magnetic and/or optical reading, like those indicated by 17, 19. The data read by the heads are subsequently processed by the computer linked to the device via the gate 39.

Linkage to a computer enables the provision of a series of auxiliary functions that can be managed directly by the computer. Provision can be made, for example, for the operator's magnetic and/or optical identification card to be read for enabling the device and hence permitting access to the computer. PROVISION can also be made for suitable indicators, or even messages on the screen of the terminal linked to the device according to the invention, for identifying the operating status of the device, to inform the operator whether or not the said device is functionally enabled.

The device can also be equipped with auxiliary systems for dealing with the cheques managed by the computer linked to it, as a function of the data read. For example, a selector can be installed at the output of the device for the selection of the output cheques or bills as a function of the data read. One possible form of selection can be as a function of the bank of issue.

Characteristically, and advantageously, the device reads the cheques put in at one side of the said device and releases them after reading from the same introduction side, which facilitates matters for the operator.

Use of a single motor—of the stepping type, with direct current or of another kind—for controlling all the systems for conveyance of the cheque or bill enables a strictly constant speed to be maintained while the said cheque is being read, which is an essential prerequisite for correct reading.

The power supply can be incorporated to advantage in the machine.

It is intended that the drawing should illustrate only an exemplary embodiment, given solely as a practical demonstration of the invention, the latter being able to vary in respect of shapes and arrangements without any departure from the scope of the concept underlying the said invention.

I claim:

1. Device for automatic reading of data on cheques, bankable bills and the like, characterized in that it comprises a housing in which is made a slot or open channel defining a U-shaped track for the said cheques and bills, and that along the said track there are arranged a combination of sensor devices for detecting the presence of a cheque or bill to be read, devices for conveying the said cheque or bill, and devices for reading the data on the said cheque or bill.

2. Device in accordance with claim 1, wherein the said conveying devices comprise a stepping motor that controls the rotation of a pulley which in turn actuates belt components for actual conveyance of the said cheques and for the driving of devices for directing the said cheques towards the said reading units.

3. Device in accordance with claim 1, wherein the slot is at an incline or directly vertical, opening upwards.

4. Device in accordance with claim 1, wherein the said conveying devices comprise a first driven pulley and a second idle pulley, the said second idle pulley being brought into contact with the first driven pulley by means of an electromagnet actuated by the said sensor.

5. Device in accordance with claim 4, wherein the said driven pulley rotates about an inclined axis.

6. Device in accordance with claim 1, wherein the said U-shaped track has a first input section and a second output section, the shape of the said input section being user-specified to facilitate insertion of the cheque or bill and the said output section being of larger dimensions than the rest of the U-shaped track to allow the cheques or bills to accumulate after being read.

7. Device in accordance with claim 1, wherein another sensor is located in alignment with the entrance to the said output section to detect the passage of cheques being output.

8. Device in accordance with claim 6, wherein a leaf spring is installed in the said output section and compresses the accumulated documents.

9. Device in accordance with claim 1, wherein the said reading devices are magnetic reading devices.

10. Device in accordance with claim 1, wherein the said reading devices are optical reading devices.

* * * * *